United States Patent [19]
Horsmann

[11] Patent Number: 4,794,717
[45] Date of Patent: Jan. 3, 1989

[54] HUNTING BLIND STRUCTURE
[76] Inventor: Edward O. Horsmann, 608 1st Ave. NW., Grand Rapids, Minn. 55744
[21] Appl. No.: 158,725
[22] Filed: Feb. 22, 1988
[51] Int. Cl.⁴ .......................................... A01M 31/02
[52] U.S. Cl. .......................................... 43/1; 135/901
[58] Field of Search ........................ 43/1; 135/87, 901

[56] References Cited

U.S. PATENT DOCUMENTS

| | | | |
|---|---|---|---|
| Re. 30,605 | 5/1981 | Witt | 43/1 |
| 586,145 | 7/1867 | Sievers, Jr. | 43/1 |
| 1,259,641 | 3/1918 | Livezey | 43/1 |
| 2,811,977 | 11/1957 | McClish | 135/901 |
| 2,953,145 | 9/1960 | Moss et al. | 135/901 |
| 2,992,503 | 7/1961 | Webb | 43/1 |
| 3,132,658 | 5/1964 | Hickman | 135/901 |
| 3,746,386 | 7/1973 | Woodward | 296/23 |
| 3,848,352 | 11/1974 | Sayles | 43/1 |
| 4,067,346 | 1/1978 | Husted | 135/901 |
| 4,067,347 | 1/1978 | Lipinski | 135/901 |
| 4,096,874 | 6/1978 | Weatherly | 135/5 |
| 4,364,193 | 12/1982 | Visco | 43/1 |
| 4,581,837 | 4/1986 | Powlus | 43/1 |
| 4,682,436 | 7/1987 | Ritson | 43/1 |

Primary Examiner—M. Jordan
Attorney, Agent, or Firm—Leo Gregory

[57] ABSTRACT

A portable hunting blind structure particularly adapted for hunting ducks and geese wherein the blind is arranged to resemble a bale of hay, an environmental item with which ducks and geese are familar and the blind provides sufficient space therein to contain a hunter.

2 Claims, 3 Drawing Sheets

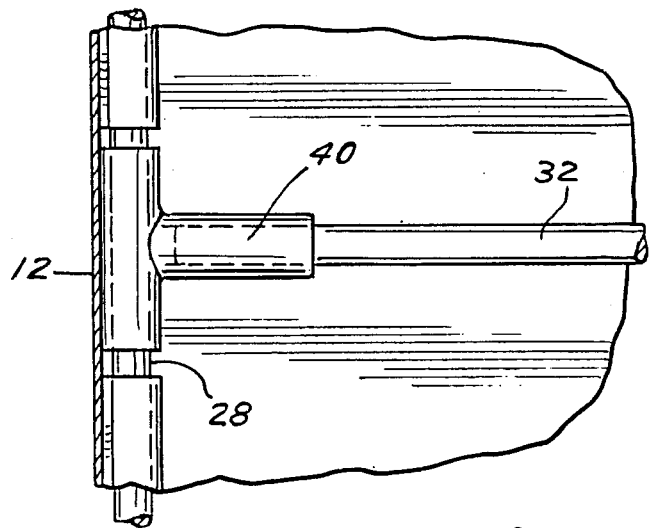
FIG. 4
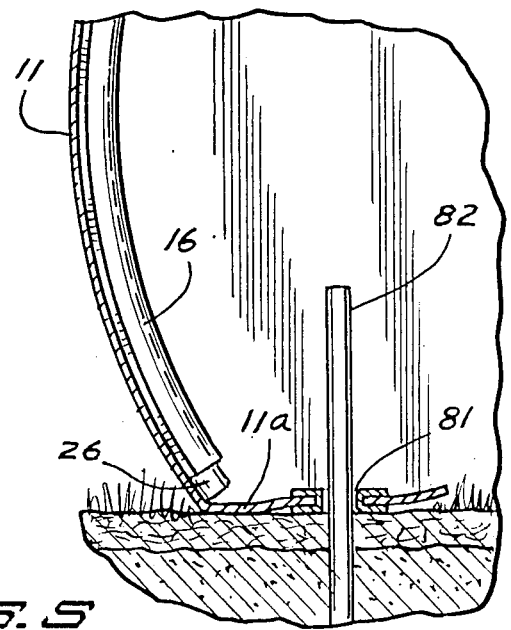
FIG. 5
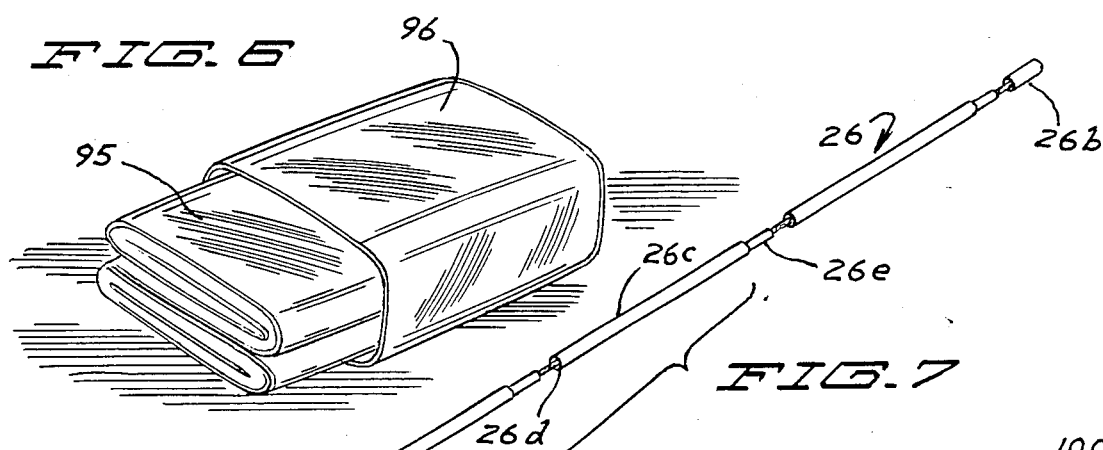
FIG. 6
FIG. 7
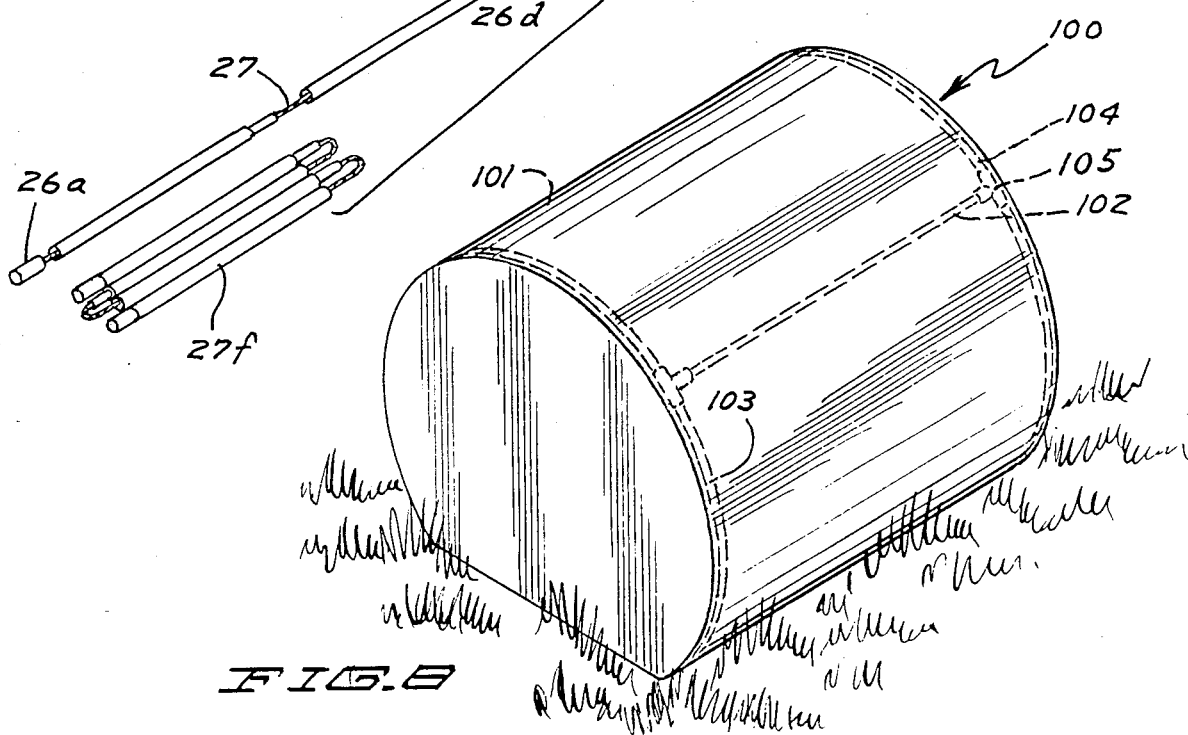
FIG. 8

HUNTING BLIND STRUCTURE

BACKGROUND OF THE INVENTION

1. Field of Invention

This invention relates to hunting blinds.

2. Brief Description of The Prior Art

In hunting as for wild game, it is desirable to be present in the habitat of the game without appearing as a strange presence. Game becomes accustomed to the appearance of its habitat and becomes wary of any foreign appearing object. Thus the wary nature of the game has given rise to the use of shelters, referred to as blinds, which appear as part of a natural environment. This condition has given rise to blinds of various kinds.

In U.S. Pat. No. 588,145 to Sievers there is disclosed a decoy shaped as a cow and is of a size to contain two hunters.

In U.S. Pat. No. 2,992,503 a game blind is disclosed in the form of a tree stump having ahinged lid for the hunters to arise to shoot at game.

In U.S. Pat. No. 3,848,352 a blind is disclosed shaped as the stump of a large tree trunk formed of reeds and having a screen hinged top for a hunter to arise in shooting.

In U.S. Pat. No. Re. 30,605 parallelepiped block-like forms are tiered to appear as bales having interior space to contain a hunter.

In U.S. Pat. No. 4,581,837 there is disclosed a large goose-like blind providig interior space to seat a hunter.

SUMMARY OF THE INVENTION

It is desirable to have a hunting blind which appears to be a natural part of the environment of an agricultural field such as having the appearance of a bale of hay.

It is also desirable to have a hunting blind which is readily collapsed into a compact bundle for transport.

Thus it is an object of the invention herein to provide a collapsible blind easily transportable which may be readily assembled as a shell structure having the outward appearance of a bale of hay of a size sufficient to provide sitting or squatting quarters for a hunter.

It is desirable to have a blind such as indicated in the previous object which provides holes and or flaps for sighting and shooting game.

It is further desirable to provide a hunting blind formed of a material having the exterior appearance of a bale of hay and having light weight transverse and longitudinal frame members to form the blind much as if on the order of erecting a tent.

It is also an object hereinto having hunting blinds of a size to contain a hunter and other blinds as if forming a cluster and being of a suitable size to serve only as a decoy.

These and other objects and advantages of the invention will be set forth in the following description made in connection with the accompanying drawings in whichlike reference characters refer to similar parts throughout the several views.

BRIEF DESCRIPTION OF THE DRAWINGS

FIG. 4 is a view in vertical sectiontaken on line 4—4 of FIG. 2. as indicated, showing a detail of construction;

FIG. 5 is a fragmentary view in section showing a detail of structure;

FIG. 6 is a view showing the cover material in collapsed position;

FIG. 7 is a composite view in perspective showing the make-up of an element of the support structure herein in erect and in collapsed condition; and FIG. 8 is a view in perspective showing a modification of a hunting blind to serve as a decoy.

DESCRIPTION OF A PREFERRED EMBODIMENT

Figures 1, 2:
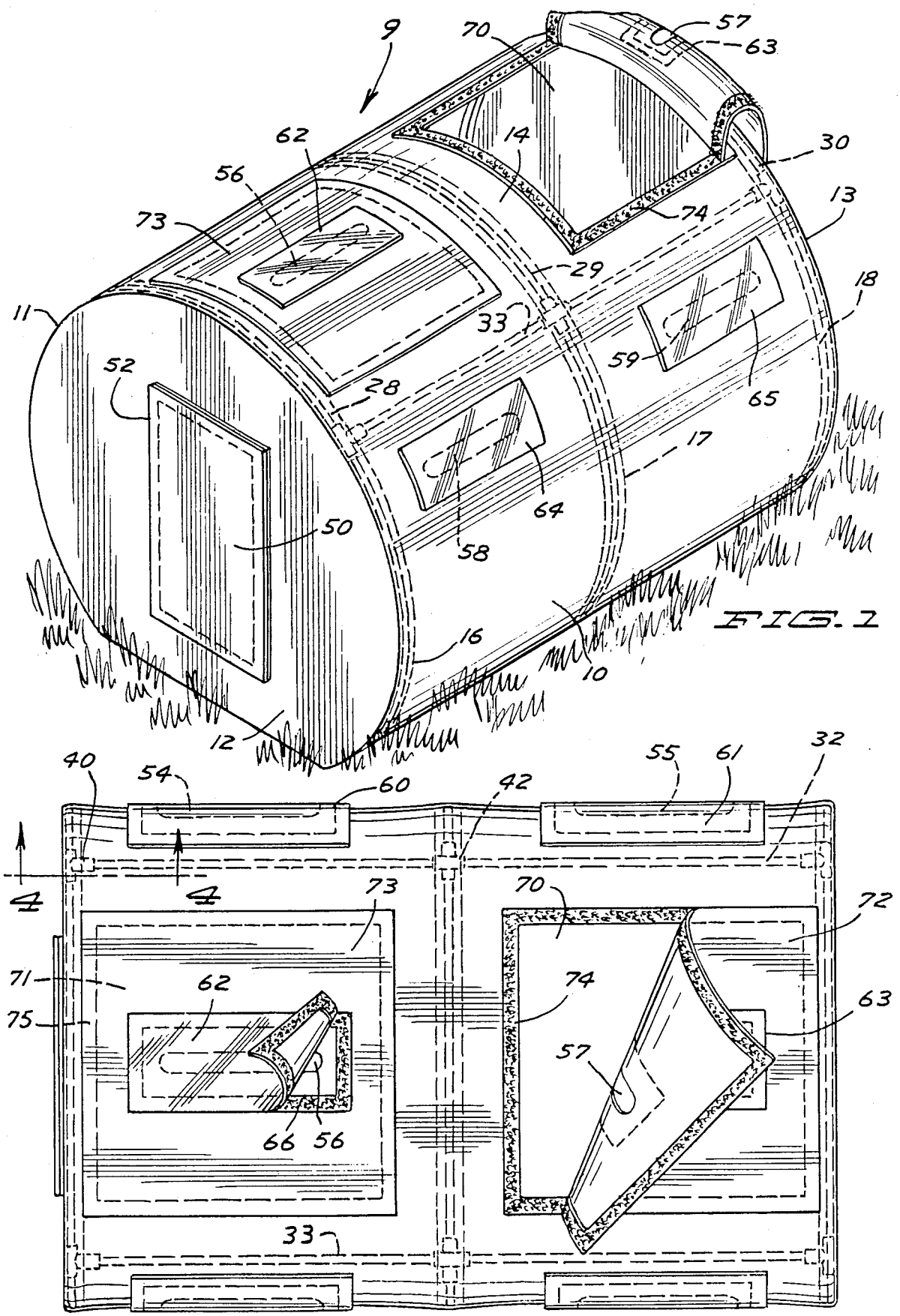
FIG. 1 is a view in perspective showing a blind in erected position.
FIG. 2 is a top plan view showing some flaps in open position.
Figure 3:
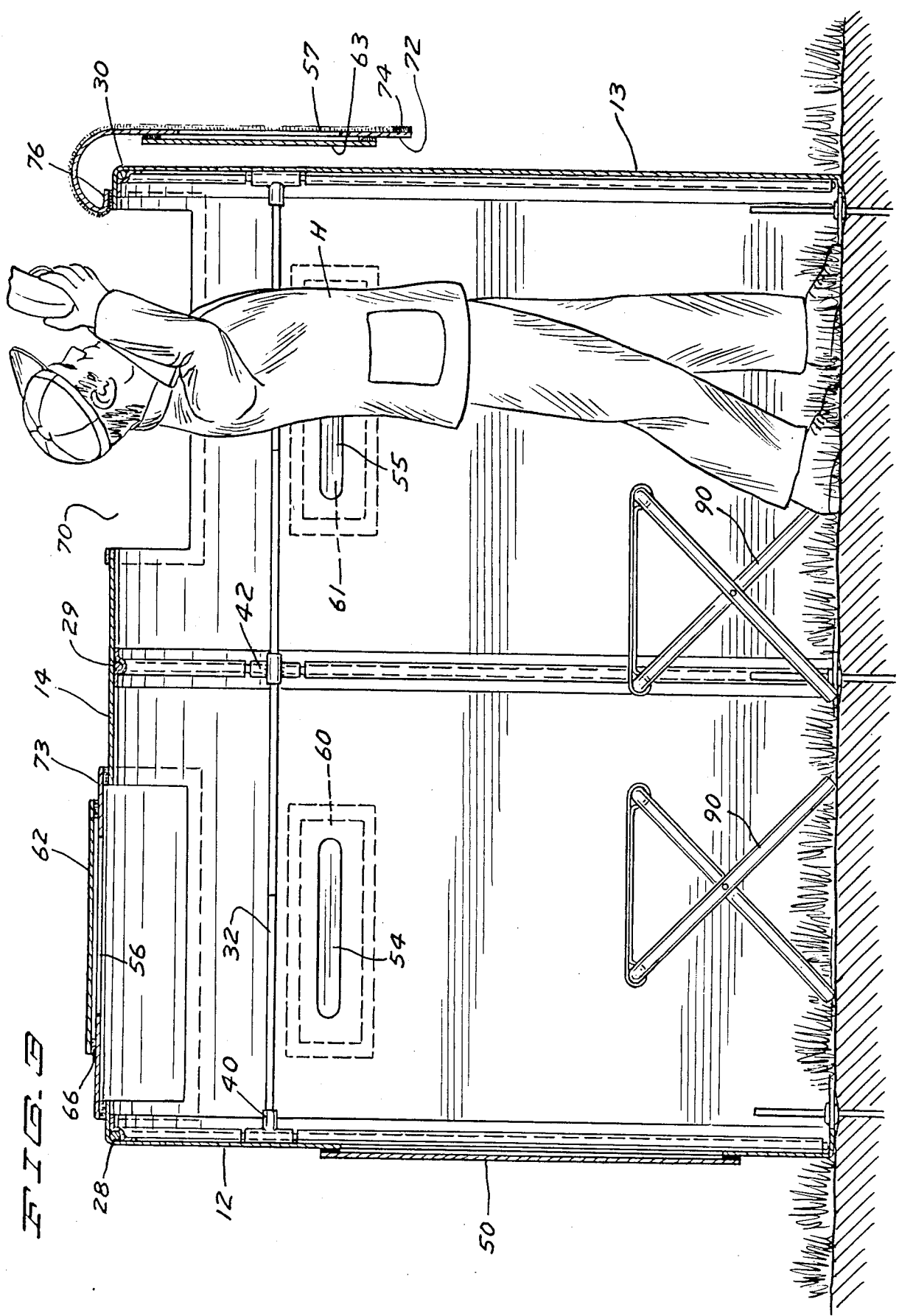
FIG. 3 is a view in vertical longitudinal section on an enlarged scale showing a hunter therein in shooting position.

Referring to the Figs., shown in FIG. 1 is a hunter's blind 9 and as indicated in FIG. 3, said blind is of a size of comfortably contain hunters in sitting position.

Said blind will be made of suitable weather resistant material such as tenting material and the same will be colored to simulate a bale of hay.

The appropriate material will be cut into the several pieces needed to form the blind and they will be sewed together to form an integral structure which consists of side walls 10 and 11, end walls 12 and 13, and a top wall 14, a bottom wall is not shown. A floor piece such as a sheet of plywood may be used if desired. The same is not shown here.

Thus the blind is formed as a shell having open ended sleeves formed therein to receive frame members, said sleeves being indicated at 16, 17 and 18 to receive transverse support members; however no sleeves are indicated to receive longitudinal supports members.

The support members as here shown are tubular rods and are segmented as represented by the member 26 in FIG. 7, the segments being extensibly held together in an interfitting relationship having an elastic cable or rope 27 extending therethrough, the ends of said rope being secured in a suitable manner internally of the terminal segments 26a and 26b. Said segments have respectively female and male ends as with the segment 26c having a female end 26d and a male end 26e.

Said frame members when assembled in interfitting relationship will be sufficiently flexible to bow or curve in being inserted into the respective transverse sleeves 16-18, as indicated at 28, 29 and 30. The longitudinal members are indicated at 32 and 33.

Tee members 40 and 42 are respectively inserted as segments in the frame members as indicated to accomodate the connection of the longitudinal and transverse members. These members are representative of the others used.

The sleeves will be provided with cut outs at the appropriate places to permit the insertion of the tee segments.

It has been found in practice that a conveniently sized blind will have a length on the order of seven feet, a diameter on the order of five feet and a ground width on the order of three and one half feet.

The rear end wall has an entry flap 50 which is secured by a self-fastening strip 52 such as a Velcro strip which is commonly used for like purposes.

Sighting slots 54–59 are formed in the blind as indicated and the same are covered over by removable flaps 60–65. Said flaps are secured by Velcro strips such as at 66. Said sighting slots may vary in number.

Major openings are formed in the top wall 14, these being openings 70 and 71 which are of a size to permit a hunter H to extend therethrough his upper body or at least his head and gun, as illustrated. Said openings are each ocvered as by Velcro secured flaps 72 and 73, the Velcro strips being indicated at 74 and 75. Said flaps may be secured at one end by stitching as indicated at 76.

It will be noted that said flaps 72 and 73 have signting openings 56 and 57 therein. Said flaps 72 and 73 preferably are opened when game has been sighted.

To secure the blind, the side walls at their bottom have small width inturned flaps as at 11a into which grommets 71 are secured and small metal stakes such as stake 82 are inserted through the grommets to secure the same to the ground. Thus these fastenings will not be visible to game birds.

A stool 90 is shown for the convenience of occupants. There may be one for each occupant.

The entire blind with frame members removed may be collapsed into a small bundle 95 whichmay be disposed into a duffel bag as indicated at 96. The frame members will have their adjacent ends disengaged and be folded up as shown at 26f in FIG. 7 and also be packed into the duffel bag.

MODIFICATION

In addition to the blind above described of a size to house a person, it is desirable to have a number of decoy blinds as represented by the blind 100 and which are formed in themanner of the blind above described and have a similar framework of members as represented by the shell 101 having longitudinal frame members of which the member 102 is shownand transverse frame members 103 and 104, said frame members having connecting tee members at at 105. Said decoys may be ground secured in any suitable manner.

The decoy blinds may be positioned as desired.

It will of course be understood that various changes may be made in form, details, arrangement and proportions of the parts without departing from the scope of the invention herein which generally stated, consists in an apparatus capable of carrying out the objects above set forth, in the parts and combination of parts disclosed and defined in the appended claims.

What is claimed is:

1. A game bird hunting blind, having in combination
   a shell of flexible material colored and sized to simulate a bale of hay,
   said shell having side and end walls and a top wall,
   spaced sleeves formed on the inner wall surface of said shell transversely thereof,
   rods removably disposed into said sleeves providing a supporting frame for said shell,
   a plurality of spaced game sighting openings in said walls of said shell, and
   removably secured flaps overlying said openings.

2. A game bird hunting blind, having in combination
   a shell of flexible material colored and sized to simulate a bale of hay.
   said material being arcuate in transverse section save for having a flat bottom, and having a top wall and opposed side and end walls,
   a plurality of sleeves transversely of said shell at the inner ends thereof and intermediate said ends,
   transverse rods forming a frame for said shell disposed into said sleeves,
   an end wall of said shell having an entry way therein,
   a plurality of game sighting holes in the walls of said shell,
   removably secured flaps overlying siad holes,
   at least one flap covered opening in said top wall portion of said shell of sufficient size to permit an occupant to rise therethrough to fire at a game bird,
   said last mentioned flap having a sighting hole therein; and
   a removable flap covering said last mentioned sighting hole.

* * * * *